United States Patent
Schmid et al.

(10) Patent No.: US 9,441,813 B2
(45) Date of Patent: Sep. 13, 2016

(54) RADIATION-EMITTING APPARATUS AND USE OF AN APPARATUS OF THIS KIND

(75) Inventors: Tobias Schmid, Canton, MI (US); Peter Brick, Regensburg (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 434 days.

(21) Appl. No.: 14/115,628

(22) PCT Filed: Apr. 16, 2012

(86) PCT No.: PCT/EP2012/056902
§ 371 (c)(1),
(2), (4) Date: Jan. 16, 2014

(87) PCT Pub. No.: WO2012/150121
PCT Pub. Date: Nov. 8, 2012

(65) Prior Publication Data
US 2014/0126204 A1   May 8, 2014

(30) Foreign Application Priority Data
May 5, 2011  (DE) .................. 10 2011 100 609

(51) Int. Cl.
*F21V 13/14*  (2006.01)
*B60Q 1/00*  (2006.01)
(Continued)

(52) U.S. Cl.
CPC ............ *F21V 13/14* (2013.01); *B60Q 1/0041* (2013.01); *B60Q 1/04* (2013.01); *B60Q 1/2607* (2013.01);
(Continued)

(58) Field of Classification Search
CPC ....... F21V 13/14; B60Q 1/04; B60Q 1/0041; B60Q 1/2607; F21S 48/115; G02B 19/0028
See application file for complete search history.

(56) References Cited

U.S. PATENT DOCUMENTS

| 3,382,367 | A | * | 5/1968 | Hardy | .................... G02B 17/00 250/216 |
| 7,616,381 | B2 | * | 11/2009 | Shen | .................... G02B 27/283 359/629 |
| 8,342,726 | B2 | * | 1/2013 | Fischer | ................ B60Q 1/0041 362/311.06 |
| 2007/0201241 | A1 | | 8/2007 | Komatsu | |

(Continued)

FOREIGN PATENT DOCUMENTS

| CN | 101132950 A | 2/2008 |
| CN | 101520550 A | 9/2009 |

(Continued)

OTHER PUBLICATIONS

Licht-Scheinwerfer Technical Information by Hella KG Hueck & Co., 2003, pp. 1-12.

*Primary Examiner* — Anabel Ton
(74) *Attorney, Agent, or Firm* — McDermott Will & Emery LLP

(57) ABSTRACT

The invention specifies a radiation-emitting apparatus (10) having a separating optics system (3) which is arranged downstream of a first radiation-emitting region (1a) and a second radiation-emitting region (1b) in the emission direction and which is suitable for separating radiation (11) which is emitted from the first radiation-emitting region (1a) and radiation (12) which is emitted from the second radiation-emitting region (1b) from one another. A secondary optics system (4) is arranged downstream of the separating optics system (3), wherein the radiation (11) which is emitted from the first radiation-emitting region (1a) is associated with a first region (4a) of the secondary optics system (4) and the radiation (12) which is emitted from the second radiation-emitting region (1b) is associated with a second region (4b) of the secondary optics system (4) which is separate from the first region (4a). The invention also specifies uses for an apparatus (10) of this kind.

17 Claims, 7 Drawing Sheets

Figure 1:
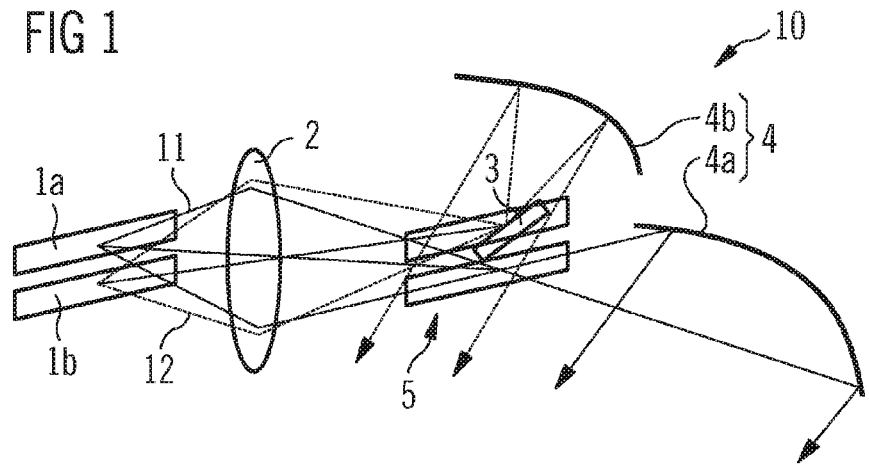

(51) Int. Cl.
 B60Q 1/04 (2006.01)
 B60Q 1/26 (2006.01)
 F21S 8/10 (2006.01)
 G02B 27/14 (2006.01)
 G02B 19/00 (2006.01)

(52) U.S. Cl.
 CPC ........... *F21S 48/115* (2013.01); *F21S 48/1154* (2013.01); *F21S 48/1159* (2013.01); *F21S 48/1163* (2013.01); *F21S 48/137* (2013.01); *F21S 48/1388* (2013.01); *F21S 48/1747* (2013.01); *F21S 48/217* (2013.01); *F21S 48/23* (2013.01); *G02B 19/0028* (2013.01); *G02B 19/0061* (2013.01); *G02B 27/143* (2013.01)

(56) References Cited

U.S. PATENT DOCUMENTS

| | | |
|---|---|---|
| 2007/0258259 A1 | 11/2007 | Ishida et al. |
| 2008/0080201 A1 | 4/2008 | Specht et al. |
| 2008/0144328 A1 | 6/2008 | Yagi et al. |
| 2009/0213448 A1 | 8/2009 | Shen et al. |

FOREIGN PATENT DOCUMENTS

| | | |
|---|---|---|
| DE | 102004043706 A1 | 4/2006 |
| EP | 1881264 A1 | 1/2008 |
| EP | 1903274 A1 | 3/2008 |
| TW | M391490 U | 11/2010 |
| WO | 2006/096467 A2 | 9/2006 |
| WO | 2009/144024 A1 | 12/2009 |

\* cited by examiner

RADIATION-EMITTING APPARATUS AND USE OF AN APPARATUS OF THIS KIND

The invention relates to a radiation-emitting apparatus comprising a separating optical unit and a secondary optical unit, and to a use of a radiation-emitting apparatus of this kind.

Many conventional radiation-emitting apparatuses are lighting systems which fulfill a predetermined light function in a static manner. In order to realize different lighting functions, for example, it is known to use, in apparatuses of this kind, additional diaphragms that are mechanically movable, the emission characteristic of the light sources upstream of the diaphragm remaining constant. However, these systems can have the disadvantage that the radiation efficiency of the lighting system is reduced by virtue of the masked-out light at the diaphragm. Moreover, the use of different diaphragms requires a requisite mechanism and servomotors, for example, which can disadvantageously increase the weight and additionally the costs of lighting systems of this kind. Moreover, an increase in the susceptibility to faults during manufacture and an increased mechanical complexity can occur.

Alternatively, light systems are known which comprise a multiplicity of discrete luminous centers that can be individually energized. Depending on the desired light function, specific groups of the luminous centers are driven and in conjunction with a projection optical unit generate different light distributions. However, the individual energization of the multiplicity of luminous centers can disadvantageously lead to a high electrical complexity and to a large distance between the individual luminous centers.

It is an object of the present application to specify a radiation-emitting apparatus which avoids the disadvantages mentioned above, thus advantageously resulting in a compact and radiation-efficient apparatus which advantageously moreover fulfills different light functions. Furthermore, it is an object of the present application to specify uses of radiation-emitting apparatuses of this kind.

These objects are achieved, inter alia, by means of a radiation-emitting apparatus comprising the features of claim 1 and by means of the use of an apparatus of this kind comprising the features of claim 15. The dependent claims relate to advantageous developments of the apparatus and of the use.

In an embodiment, the radiation-emitting apparatus comprises a separating optical unit, which is disposed downstream of a first radiation-emitting region and a second radiation-emitting region in the emission direction. Furthermore, the separating optical unit is suitable for separating radiation emitted by the first radiation-emitting region and radiation emitted by the second radiation-emitting region from one another. Moreover, the apparatus comprises a secondary optical unit, which is disposed downstream of the separating optical unit. The radiation emitted by the first radiation-emitting region is assigned to a first region of the secondary optical unit. The radiation emitted by the second radiation-emitting region is assigned to a second region of the secondary optical unit, said second region being separated from the first region.

The apparatus accordingly comprises a plurality of optical units which are aligned and arranged with respect to one another in such a way that they separate the radiation emitted by the different regions. In particular, the beams emitted by the individual radiation-emitting regions impinge on regions of the secondary optical unit which are spatially separated from one another. The secondary optical unit is embodied as a segmented optical unit, for example.

"Impinging on regions of the secondary optical unit which are spatially separated from one another" means, in particular, that the radiation emitted by the first radiation-emitting region impinges for the most part on a different region of the secondary optical unit than the radiation emitted by the second radiation-emitting region. In this case, "for the most part" means, in particular, that more than 80% of the radiation emitted by the first radiation-emitting region impinges on said separated region of the secondary optical unit. Insignificant small overlaps of the beams of the radiation-emitting regions can occur in this case.

Separation should be understood to mean, in particular, that the beams emitted by the different regions, after passing through the plurality of optical units, are for the most part isolated from one another, that is to say substantially not mixed with one another. Consequently, the radiation emitted by the first radiation-emitting region is coupled out from a first region of the apparatus and the radiation emitted by the second radiation-emitting region is coupled out from a second region, adjacent thereto. In this case, of course, a slight mixing of the beams emitted by the regions can take place occasionally.

The beams of the different radiation-emitting regions are separated primarily by means of the separating optical unit, such that already when the beams impinge on the secondary optical unit, said beams are already separated from one another for the most part. The secondary optical unit likewise has two regions separated from one another wherein the first region of the secondary optical unit is assigned to the first radiation-emitting region and the second region of the secondary optical unit is assigned to the second radiation-emitting region. Insignificant overlaps between the regions of the secondary optical unit can occur in this case.

In a development, the apparatus furthermore comprises a primary optical unit, which is arranged between the separating optical unit and the radiation-emitting regions. The separating optical unit is thus preferably arranged between the primary optical unit and the secondary optical unit. In this case, a downstream arrangement of the optical units with respect to one another should always be understood to mean an arrangement in the direction of the beam path, of the radiation emitted by the radiation-emitting regions. In this case, the radiation emitted by the radiation-emitting regions firstly impinges on the primary optical unit, before it impinges on the separating optical unit, if appropriate, the radiation subsequently being guided to the secondary optical unit in order ultimately to be coupled out from the apparatus.

By means of an apparatus of this kind, it is possible to realize for example headlight systems which have a plurality of light functions by specific radiation-emitting regions being switched on or off. In this case, on the basis of a preferably separate driving of individual radiation-emitting regions, no components of the apparatus have to be mechanically moved. Advantageously, moreover, no diaphragms are used, with the result that the radiation efficiency is not limited by such diaphragms, rather only optical efficiency losses occur as a result of, for example, losses at the different optical units of the apparatus. The resulting dimensions of such radiation-emitting apparatuses for fulfilling a plurality of light functions can advantageously be kept very compact owing to the fact that the diaphragms, mechanisms and servomotors are not needed. As a result, applications can be made possible which hitherto could not be realized, or could be realized only with difficulty, for reasons of limited space. This affords diverse designertechnological possibilities for the configuration of apparatuses of this kind, whereby for example legally prescribed standards can be fulfilled.

In the context of the application, an optical unit should be understood to mean an optical element suitable for influencing radiation in a predetermined manner. Such optical elements or optical units are suitable, for example, for refracting and/or reflecting light.

In a development, the first radiation-emitting region and the second radiation-emitting region are arranged on a common carrier, for example a common circuit board. By way of example, the radiation-emitting regions are an LED in each case, which are arranged on a common carrier and which can be energized separately, as a result of which they can emit radiation separately. The radiation-emitting regions each have a semiconductor body, for example, which comprises an active layer suitable for generation.

The semiconductor body of the radiation-emitting regions is formed for example in each case by a semiconductor chip, preferably by a thin-film semiconductor chip. A thin-film semiconductor chip is a semiconductor chip in which a growth substrate has been detached during the production of said semiconductor chip.

As a result of the embodiment of the radiation-emitting regions on a common carrier, the individual regions can be positioned very precisely with respect to one another in a process-governed fashion. Thus, a relative position of the individual radiation-emitting regions is fixedly predefined and requires no further adjustment, such as, for example, when using a multiplicity of discrete luminous centers. The dimensions of an apparatus comprising such radiation-emitting regions can thus advantageously be reduced further. As a result, applications are possible which hitherto were not possible, or were possibly only with difficulty, for reasons of limited space.

On account of the embodiment of the radiation-emitting regions on a common carrier, the use of a single circuit board, onto which the semiconductor bodies are mounted, advantageously suffices. Separate circuit boards for individual discrete luminous centers are advantageously not necessary, as a result of which apparatuses of this kind are advantageously cost-effective.

For dissipating power losses of the radiation-emitting regions, a single heat sink furthermore advantageously suffices on account of the embodiment on a common carrier. As a result, there is advantageously no need for a plurality of individual heat sinks such as are necessary for example in the case of a plurality of individual discrete luminous centers. As a result, the arrangement of the downstream optical units can advantageously be realized so as to make possible a thermally favorable position for the radiation-emitting regions.

The radiation-emitting regions of the apparatus can emit single-colored or at least partly different-colored light. The apparatus comprises, for example, an array of radiation-emitting regions, which emits light in the same color locus range. Alternatively, the apparatus can comprise an array of radiation-emitting regions with light of at least two different colors.

In a development, the separating optical unit and/or the secondary optical unit are/is embodied as reflectors. By way of example the separating optical unit is a planar mirror which at least partly deflects the radiation passing from the primary optical unit in the direction of the secondary optical unit. In this case, the secondary optical unit likewise has a reflective surface which deflects the radiation deflected by the separating optical unit in the direction of the radiation coupling-out side of the apparatus.

In a development, the primary optical unit is a converging optical unit, a collector and/or a light-refracting optical unit. By way of example, the primary optical unit is a refractive optical unit. In this case, the primary optical unit is suitable for directing the radiation emitted by the radiation-emitting regions in the direction of the separating optical unit and/or the secondary optical unit.

By way of example, the primary optical unit is a reflector, preferably an ellipsoidal reflector, a concentrator or a lens, preferably a converging lens.

In a development, the distance between the radiation-emitting regions and the primary optical unit is in a range of between 1 mm and 20 mm, preferably between 1 mm and 5 mm. By way of example, the primary optical unit is arranged at a distance of 1.6 mm from the radiation-emitting regions.

Preferably, the primary optical unit contains glass and is suitable for separating for the most part radiation emitted by the different radiation-emitting regions. By way of example, the primary optical unit is an optical unit which is suitable for generating an intermediate image of the radiation-emitting regions in an intermediate plane between the primary optical unit the and secondary optical unit. The separating optical unit is preferably arranged in the intermediate image of the second radiation-emitting region. The separating optical unit is thus arranged in the intermediate plane between the primary optical unit and the secondary optical unit. In this case, the intermediate image need not be an exact imaging of the individual radiation-emitting regions. Rather, the intermediate image has two spatially separated regions, wherein for the most part the radiation emitted by the first radiation-emitting region is transferred into the first region of the intermediate image and the radiation emitted by the second radiation-emitting region is transferred into the second region of the intermediate image. Slight overlaps of the regions of the intermediate image can occur in this case.

As a result of the arrangement of the separating optical unit exclusively in the intermediate image of the second radiation-emitting region, preferably exclusively a reflection of the radiation emitted by the second radiation-emitting region takes place at the separating optical unit. As a result, the radiation emitted by the second radiation-emitting region experiences a reflection at the separating optical unit, while at the same time the radiation emitted by the first radiation-emitting region is guided past the separating optical unit since in this case the intermediate image of the first radiation-emitting region is arranged adjacent to the separating optical unit.

In a development, the distance between the first radiation-emitting region and the second radiation-emitting region is in a range of between 30 μm and 3 mm, preferably between 100 μm and 300 μm. Preferably, the radiation-emitting regions are arranged at a distance of, for example, 200 μm with respect to one another. Such a close arrangement can be realized, in particular, by the embodiment on a common carrier. In this case, an encroaching spreading of the radiation emitted by the different radiation-emitting regions, a so-called crosstalking, can be prevented by the downstream optical units.

In a development, the radiation emitted by the first radiation-emitting region experiences two reflections and the radiation emitted by the second radiation-emitting region experiences four reflections by the primary optical unit, the separating optical unit and/or the secondary optical unit. By way of example, the radiation emitted by the first radiation-emitting region is deflected at the primary optical unit in the direction of the secondary optical unit, and is reflected from there in the direction of the coupling-out side of the apparatus. The radiation emitted by the second radiation-emitting region is deflected at the primary optical unit in the direction of the separating optical unit, and reflected from there back in the direction of the primary optical unit, wherein this radiation is directed at the primary optical unit to the secondary optical unit and reflected at the secondary optical unit in the direction of the radiation coupling-out side of the apparatus.

Such an arrangement of the optical units with respect to one another and the configurations of the individual reflection processes and sequences can advantageously make possible an apparatus whose radiation emitted by the individual radiation-emitting regions is present in a manner separated from one another at the coupling-out side of the apparatus.

In a development, the radiation emitted by the first radiation-emitting region and the radiation emitted by the second radiation-emitting region fulfill different light functions. In this case, the light functions can be realized by specific radiation-emitting regions being switched on or off. By way of example, the light functions are a combined low-beam and high-beam light for motor vehicles, a combined daytime running light and direction indicator, a combined brake light and tail light, a combined light and direction indicator for bicycles, a combined lighting and/or indicator luminaires in domestic appliances. Moreover, apparatuses of this kind find applications in interior and exterior lighting in order to realize a plurality of light functions, wherein in this case the number of light functions made available corresponds to the number of radiation-emitting regions. Apparatuses of this kind can likewise be employed for optical encoders for miniature applications.

The different light functions can be made possible by the specific regions being respectively switched on or off. By way of example, the first radiation-emitting region is suitable for serving as a low-beam light for motor vehicles, while the radiation emitted by the second radiation-emitting region is suitable as a high-beam light for motor vehicles. If a low-beam light is desired, only the first radiation-emitting region is energized, such that the second radiation-emitting region emits no light during operation. Conversely, in the case of a desired high-beam light, only the second radiation-emitting region is energized, while the first radiation-emitting region is switched off and accordingly emits no radiation.

Consequently, the radiation-emitting regions are advantageously electrically drivable separately from one another, in order to be able to fulfill the different light functions.

In a development, the radiation-emitting apparatus fulfills both the ECE standards and the SAE standards. In this case, the ECE standards are internationally agreed standardized technical specifications for vehicles and parts of motor vehicles (ECE: Economic Commission for Europe). In this case, the SAE standards are standards of the Society of Automotive Engineers, which is a nonprofit organization for technology and science (SAE: Society of Automotive Engineers).

The radiation-emitting apparatus can accordingly fulfill both the ECE and SAE standards by means of corresponding driving of the individual radiation-emitting regions. By way of example, it is thus possible to avoid a necessary outlay for producing different headlight systems for different countries or regions, as a result of which costs can advantageously be reduced. In this case, the apparatuses can be changed over depending on the required standard. By way of example, the radiation emitted by the first radiation-emitting region fulfills the ECE standards and the radiation emitted by the second radiation-emitting region fulfills the SAE standards.

Figure 5A:
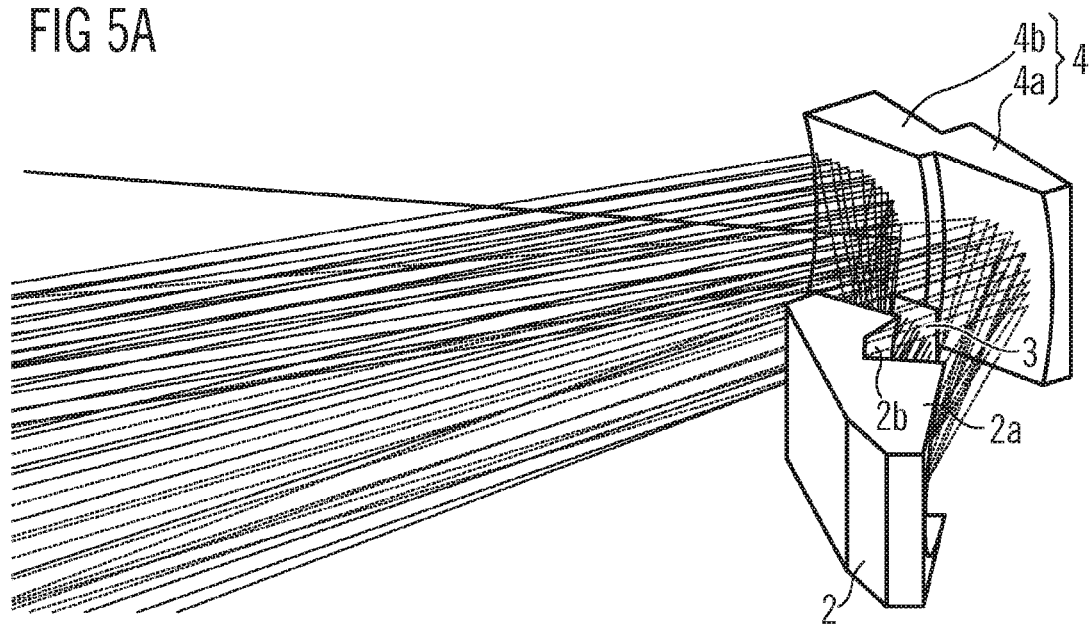
Figure 5B:
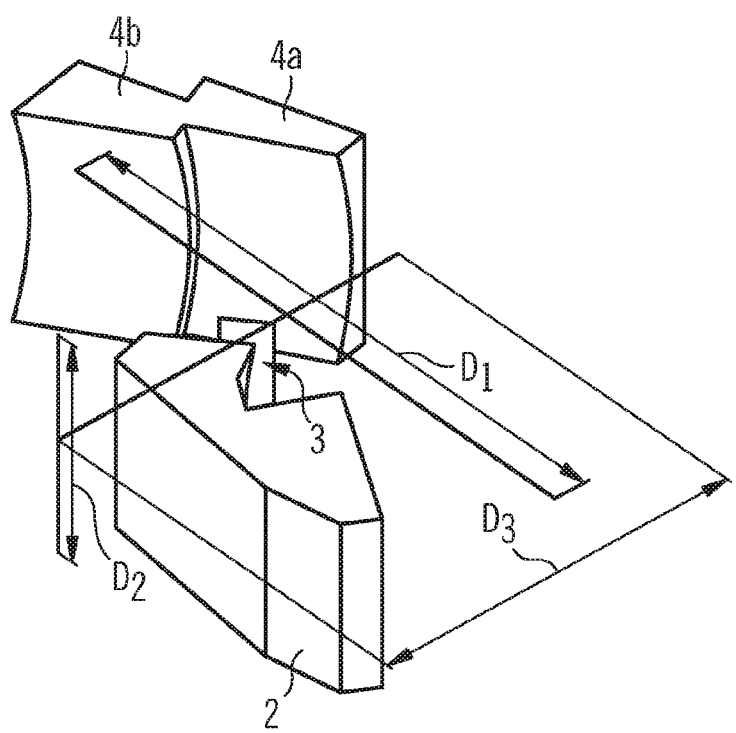
Figure 5C:
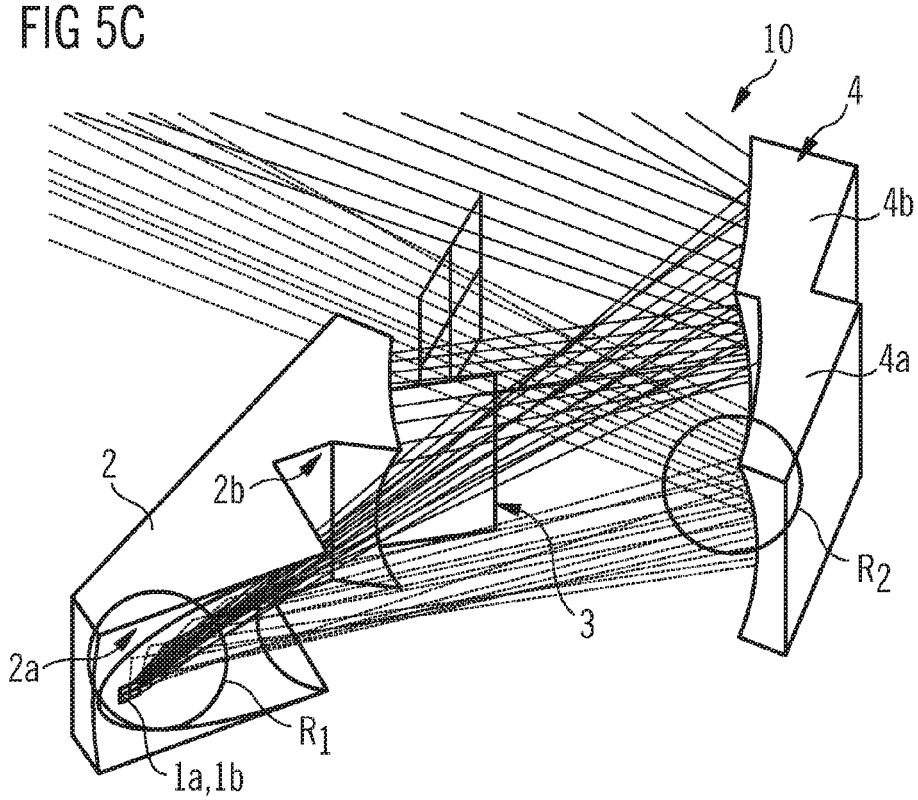
Figure 5D:
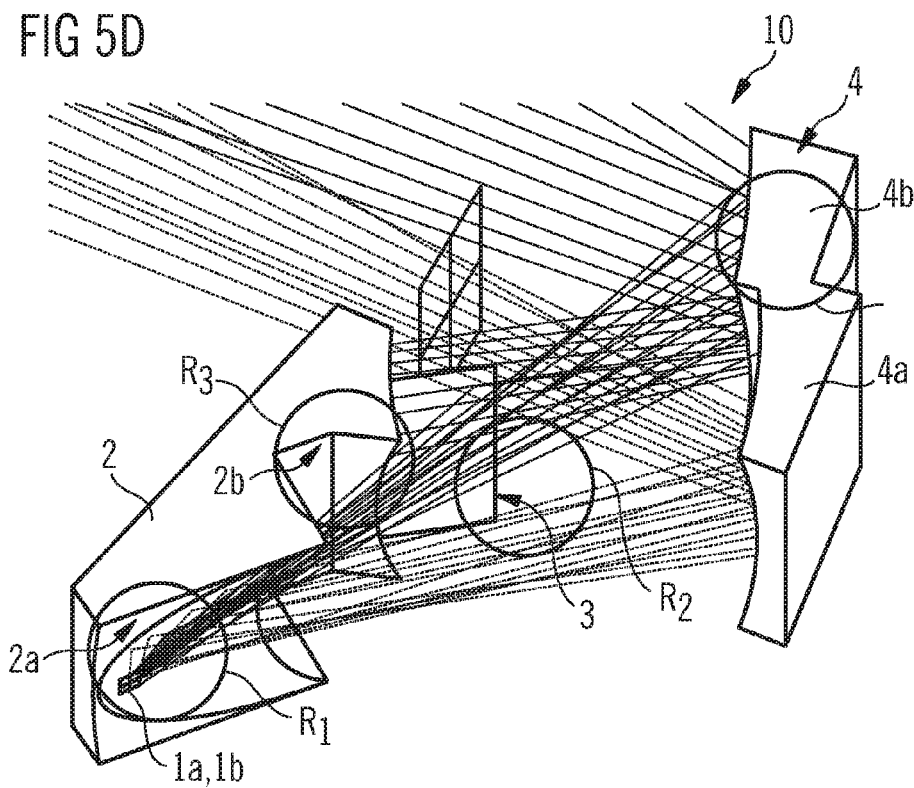
Figure 6A:
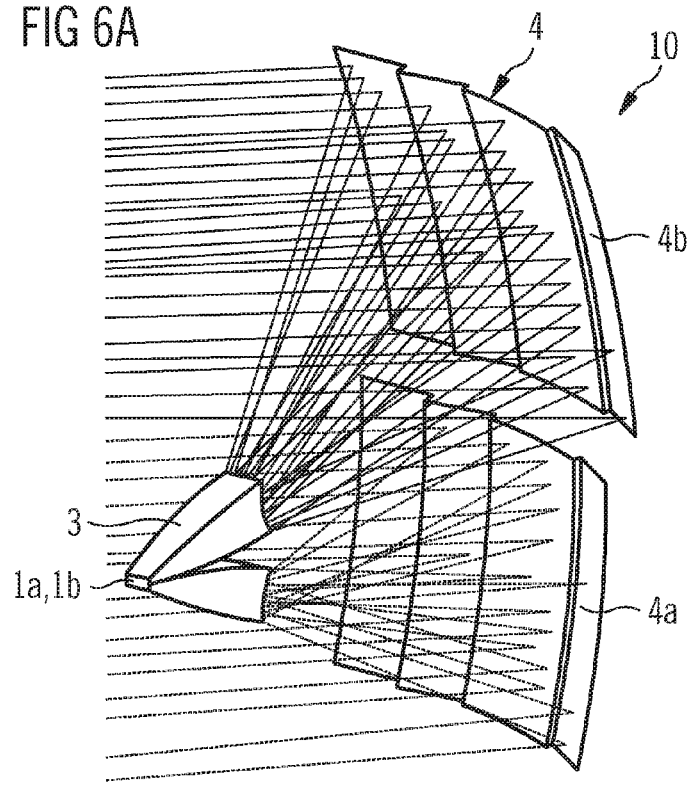
Figure 6B:
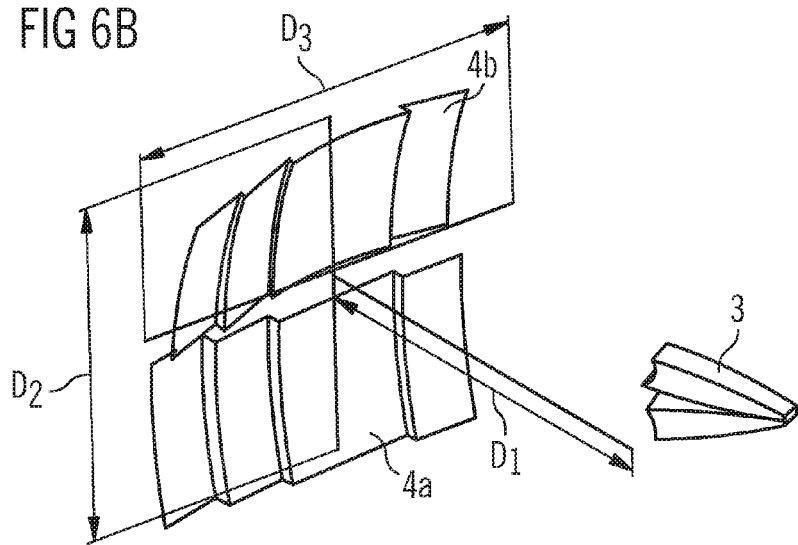
Figure 6C:
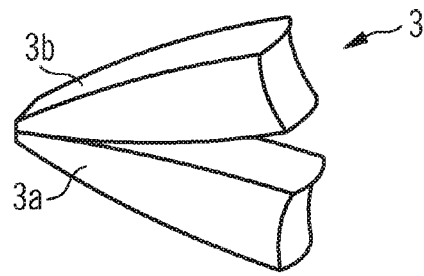
Figure 7A:
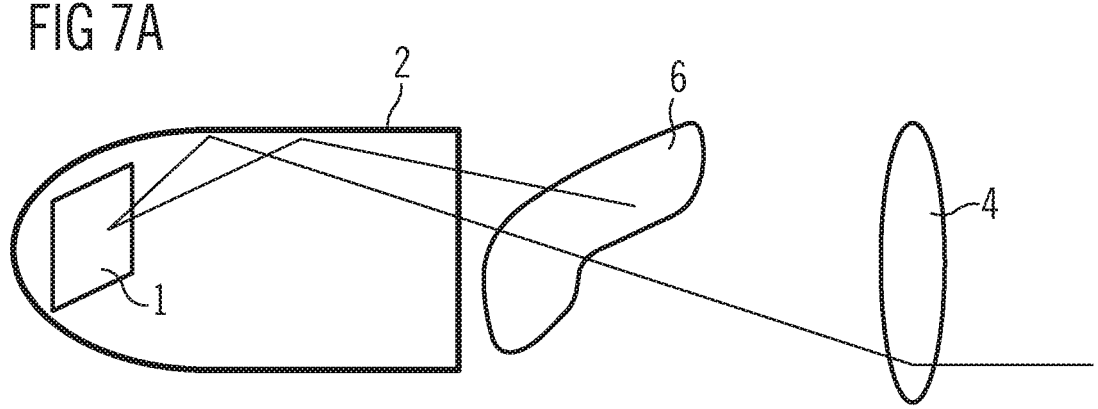
Figure 7B:
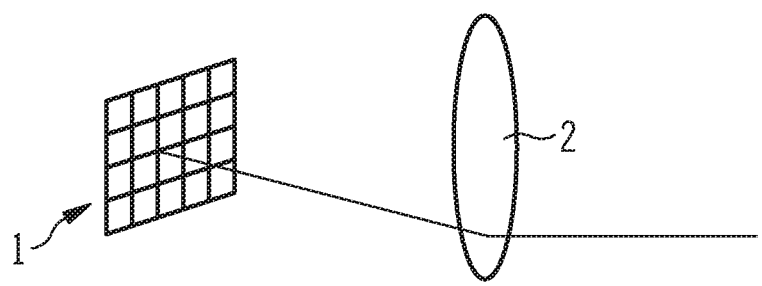
Figure 7C:
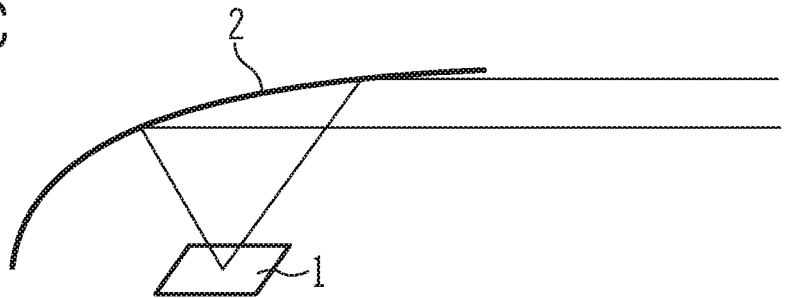

Further advantages and advantageous developments of the invention will become apparent from the exemplary embodiments described below in conjunction with FIGS. 1 to 7, in which:

FIGS. 1, 4A, 4B, 5A to 5D, 6A and 6B in each case show a schematic view of an exemplary embodiment of a radiation-emitting apparatus according to the invention, FIGS. 2A to 2C, 3A, 3B and 6C in each case show a schematic view of an exemplary embodiment of a primary optical unit of a radiation-emitting apparatus according to the invention and FIGS. 7A to 7C in each case show a schematic view of an exemplary embodiment of a radiation-emitting apparatus in accordance with the prior art.

In the figures, identical or identically acting constituent parts may in each case be provided with the same reference signs. The illustrated constituent parts and their size relationships among one another should not be regarded as true to scale. Rather, individual constituent parts, such as, for example, layers, structures, components and regions, may be illustrated with exaggerated thickness or size dimensions in order to enable better illustration and/or in order to afford a better understanding.

FIG. 7A illustrates a view of a radiation-emitting apparatus in accordance with the prior art, comprising a radiation-emitting region 1, which is an LED, for example. The LED 1 is arranged in a primary optical unit 2, which is a reflector, for example. The LED emits radiation during operation, said radiation being reflected at the reflector 2. In order to provide an adaptive apparatus, a diaphragm 6 is arranged at a light exit opening of the reflector 2, said diaphragm being mechanically movable in order to realize different lighting functions. The radiation of the LED 1 upstream of the diaphragm 6 remains constant in this case. A secondary optical unit 4 can be disposed downstream of the diaphragm 6, said secondary optical unit being suitable for making possible a predetermined and desired emission characteristic of the apparatus.

The apparatus in accordance with FIG. 7A has the disadvantage, however, that the radiation efficiency of the apparatus is reduced by virtue of the masked-out light at the diaphragm 6. Moreover, the use of said diaphragm 6 requires a requisite mechanism and/or servomotors, which leads to an additional weight and to additional costs. Moreover, the susceptibility to faults during manufacture and mechanical complexity can disadvantageously increase.

The prior art furthermore discloses an apparatus comprising a multiplicity of luminous centers which can be energized individually, as illustrated in FIG. 7B. Depending on the desired light function, specific groups of the luminous centers 1 are driven and in conjunction with a primary optical unit 2, for example a projection optical unit, generate different light distributions. However, the individual energization of the large number of luminous centers results in a high electrical complexity and in a large distance between the individual luminous centers.

FIG. 7C shows an apparatus in accordance with the prior art wherein a primary optical unit 2 is disposed downstream of a radiation-emitting region 1, for example an LED, said primary optical unit 2 being embodied as a non-imaging optical unit. By way of example, the primary optical unit 2 is a faceted reflector. Exact imaging of the LED into an intermediate plane is not possible with an apparatus of this kind.

In order to realize an intermediate image of, for example, two radiation-emitting regions by means of a compact apparatus which moreover is cost-effective and fulfills different light functions, according to the invention a separating optical unit and a secondary optical unit are disposed downstream of the radiation-emitting regions. Radiation-emitting apparatuses according to the invention and their components will be explained in greater detail below in association with FIGS. 1 to 6.

FIG. 1 shows a schematic view of a radiation-emitting apparatus 10 comprising two radiation-emitting regions 1a, 1b, a primary optical unit 2, a separating optical unit 3 and a secondary optical unit 4. The radiation-emitting regions 1a and 1b are preferably arranged on a common carrier, for example a common circuit board (not illustrated). By way of example, the radiation-emitting regions have a semiconductor body in each case, which are preferably electrically drivable separately from one another. The semiconductor body here in each case has an active layer which is suitable and provided for generation and which is formed from an III/V semiconductor material, for example. The radiation-emitting regions 1a, 1b can emit identically colored light or different-colored light.

On account of the configuration of the emitting regions 1a, 1b on a common carrier, a close arrangement of the radiation-emitting regions with respect to one another can be realized, as a result of which a compact apparatus is made possible. A cost-effective apparatus can furthermore be realized by virtue of the arrangement on a common circuit board. For dissipating the power loss of the radiation-emitting regions 1a, 1b, it is possible to use a heat sink (not illustrated) arranged with respect to the radiation-emitting regions 1a, 1b in such a way that a thermally favorable position is obtained.

The distance between the radiation-emitting regions 1a, 1b is preferably in a range of between 30 μm and 3 mm. The distance is preferably 200 μm.

A primary optical unit 2 is disposed downstream of the radiation-emitting regions 1a, 1b in the emission direction. The primary optical unit 2 is preferably an optical unit which is suitable for generating an intermediate image of the radiation-emitting regions 1a, 1b in an intermediate plane 5. In this case, the beams 11, 12 emitted by the radiation-emitting regions 1a, 1b pass through the primary optical unit 2 to the intermediate plane 5.

Configurations of the primary optical unit 2 are explained in greater detail in association with FIGS. 2A to 2C, 3A and 3B.

The distance between the radiation-emitting regions 1a, 1b and the primary optical unit 2 is preferably in a range of between 1 mm and 20 mm, for example 1.6 mm. A compact apparatus can preferably be obtained by means of a distance in such a range.

A separating optical unit 3 is disposed downstream of the primary optical unit 2, said separating optical unit being suitable for separating radiation 11 emitted by the first radiation-emitting region 1a and radiation 12 emitted by the second radiation-emitting region 1b from one another. In this case, the separating optical unit 3 is arranged in the intermediate image of the second radiation-emitting region. The separating optical unit 3 is therefore arranged in the intermediate plane 5. As a result, the radiation 12 emitted by the second radiation-emitting region 1b experiences a reflection at the separating optical unit 3, while the radiation 11 emitted by the first radiation-emitting region is guided past the separating optical unit 3.

A secondary optical unit 4 is disposed downstream of the separating optical unit 3, said secondary optical unit comprising two regions 4a, 4b. In this case, radiation 11 emitted by the first radiation-emitting region 1a impinges for the most part on the first region 4a of the secondary optical unit 4. Preferably, more than 80% of the radiation 11 emitted by the first radiation-emitting region 1a impinges on the first region 4a of the secondary optical unit 4. Radiation 12 emitted by the second radiation-emitting region 1b impinges for the most part on a second region 4b, which is separated from the first region 4a of the secondary optical unit 4. The splitting of the beams of the different radiation-emitting regions that is effected by means of the separating optical unit 3 can thus be further intensified.

The separating optical unit 3 is accordingly arranged between the primary optical unit 2 and the secondary optical unit 4.

The separating optical unit 3 is a planar mirror, for example, and the secondary optical unit 4 is preferably embodied as a reflector.

The beam path of the radiation 11 emitted by the first radiation-emitting region 1a passes firstly through the primary optical unit 2, there forms the intermediate image of the first radiation-emitting region 1a in the intermediate plane 5 and is subsequently reflected at the first region 4a of the secondary optical unit 4 in the direction of the radiation coupling-out side of the apparatus 10. The beam path of the radiation 12 emitted by the second region 1b passes through the primary optical unit 2, forms the intermediate image of the second radiation-emitting region 1b in the intermediate plane 5, is reflected at the separating optical unit 3 in the direction of the second region 4b of the secondary optical unit 4 and is guided from there in the direction of the coupling-out side of the apparatus 10. Accordingly, the radiation 12 emitted by the second radiation-emitting region 1b experiences a further additional reflection in comparison with the radiation 11 of the first radiation-emitting region 1a. In this case, the beams 11, 12 emitted by radiation-emitting regions 1a, 1b are separated from one another by means of the optical units. In particular, the beams 11, 12 of the first and second regions 1a, 1b which couple out from the apparatus 10 are thereby spatially separated from one another.

The radiation 11 emitted by the first radiation-emitting region 1a and the radiation 12 emitted by the second radiation-emitting region 1b preferably fulfill different light functions. As a result of the individual radiation-emitting regions 1a, 1b being switched on or off, different light functions can thus be realized by means of a single apparatus. In this case, the apparatus can advantageously be kept compact.

By way of example, the first and second radiation-emitting regions 1a, 1b fulfill as light function a combined low-beam and high-beam light for motor vehicles, a combined daytime running light and direction indicator, a combined brake light and tail light, a combined light and direction indicator for bicycles, a combined lighting and indicator luminaires in domestic appliances. Moreover, apparatuses of this kind find application in interior and exterior lighting in order to realize a plurality of light functions depending on the number of radiation-emitting regions. Apparatuses of this kind can also be employed for optical encoders for miniature applications or as headlight systems which can be changed over depending on a required standard. By way of example, the ECE or SAE standards are employed as standards.

Figure 2A:
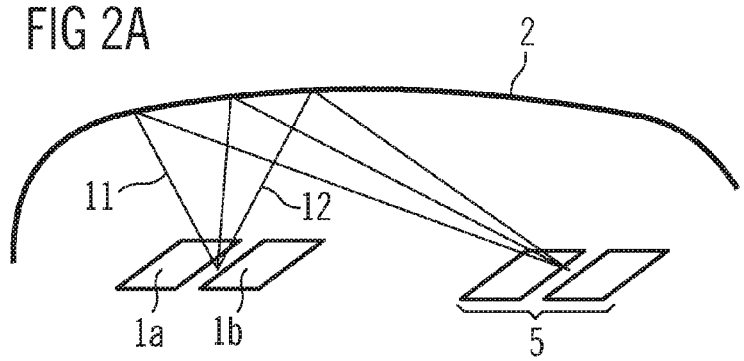
Figure 2B:
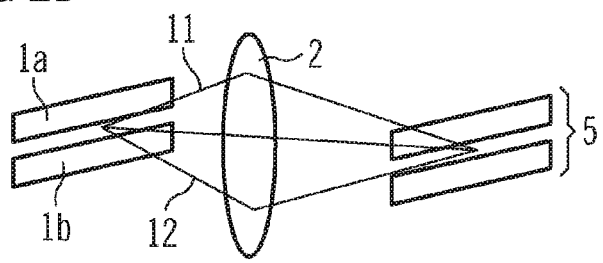
Figure 2C:
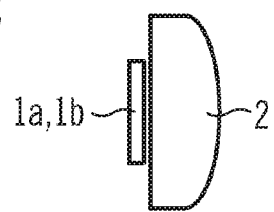

Various configurations of the primary optical unit 2 are indicated in greater detail inter alia in FIGS. 2A to 2C.

In FIG. 2A, the primary optical unit is embodied as an ellipsoidal reflector suitable for generating an intermediate image of the radiation-emitting regions 1*a*, 1*b* by means of suitable beam guiding 11, 12 in an intermediate plane 5. In the exemplary embodiment in FIG. 2B, the primary optical unit 2 is a lens system that is likewise suitable for generating the intermediate image of the radiation-emitting regions 1*a*, 1*b* in an intermediate plane 5.

The primary optical unit 2 in FIG. 2C is a lens system configured in such a way that said system can be arranged as close as possible to the radiation-emitting regions 1*a*, 1*b*. Accordingly, the lens system must have good transmission and a good thermal stability.

Figure 3A:
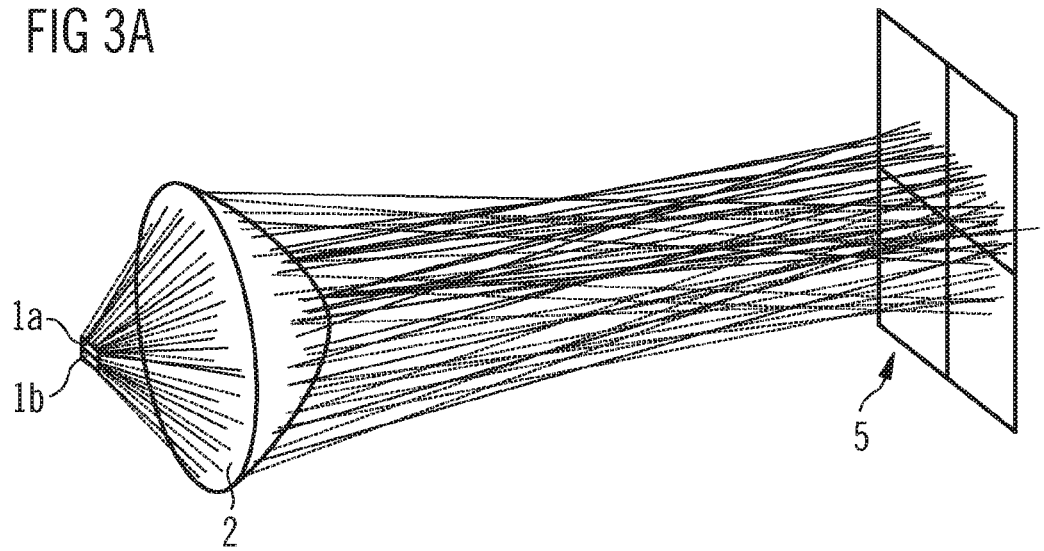
Figure 3B:
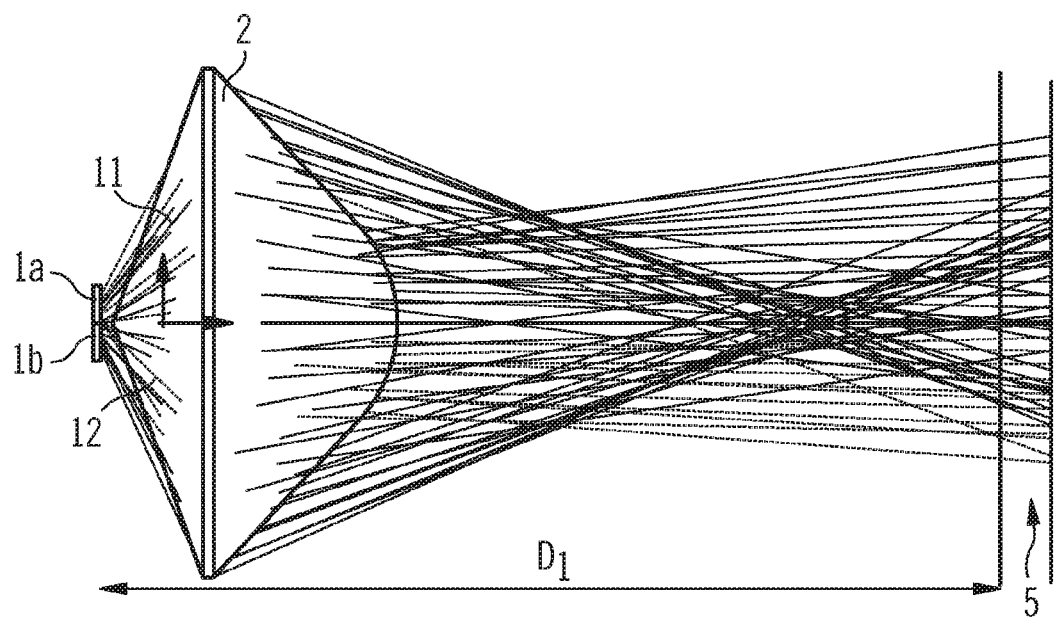

The functioning of such primary optical units is illustrated in greater detail in FIGS. 3A and 3B. The radiation-emitting regions 1*a*, 1*b* are disposed upstream of the primary optical unit 2 in FIG. 3A at a distance of approximately 4 mm. The radiation-emitting regions 1*a*, 1*b* are arranged on a common carrier, for example, and together have a lateral extent of approximately 1 mm×5 mm. In this case, the radiation-emitting regions are at a distance of approximately 200 μm from one another.

The primary optical unit 2 is embodied as a lens which comprises glass, for example, and has a diameter of approximately 27 mm and a thickness of approximately 17 mm. Such a size of the primary optical unit 2 is suitable for improved separation of the different beams of the different radiation-emitting regions. The primary optical unit 2 generates an intermediate image of the radiation-emitting regions 1*a*, 1*b* in an intermediate plane 5. In the intermediate plane, the beams emitted by the radiation-emitting regions are imaged for the most part in a manner separated from one another in accordance with the radiation-emitting regions. In this case, a slight unsharpness and overlap of the regions of the intermediate image can occur, but are not disadvantageous for possible applications of the apparatus.

In this case, the radiation-emitting regions are each respectively assigned a light function. By way of example, one of the radiation-emitting regions is suitable for a high beam intensity as high-beam light application, for example, and the other radiation-emitting region is suitable for a low beam intensity as low-beam light, for example.

FIG. 3B illustrates an exemplary embodiment of a primary optical unit in cross section. The distance $D_1$ between radiation-emitting regions 1*a*, 1*b* and the intermediate plane 5 is 54 mm, for example, the distance between the radiation-emitting regions 1*a*, 1*b* and the primary optical unit 2 being approximately 1.6 mm. In this case, the primary optical unit preferably has a diameter of 30 mm and a thickness of 18 mm in order to ensure a suitable generation of the intermediate image of the radiation-emitting regions 1*a*, 1*b* in the intermediate plane 5. By means of such a primary optical unit 2, an optical crosstalking of the beams emitted by the individual radiation-emitting regions 1*a*, 1*b* can advantageously for the most part be avoided or reduced, such that the respective desired light function is made possible by suitable energization of the radiation-emitting regions.

Figure 4A:
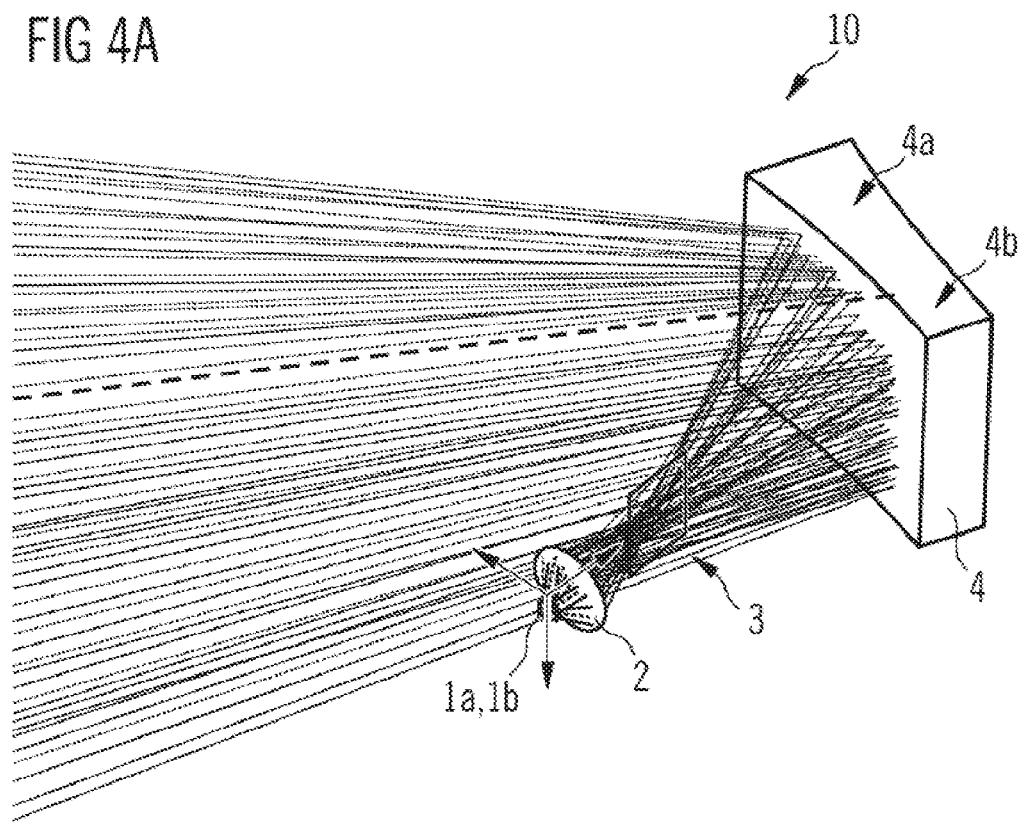

FIG. 4A illustrates a radiation-emitting apparatus according to the invention, with the beam paths being depicted. The primary optical unit 2 is disposed downstream of the radiation-emitting regions 1*a*, 1*b* and generates an intermediate image of the radiation-emitting regions 1*a*, 1*b* in the intermediate plane, in which the separating optical unit 3 is arranged. In this case, the separating optical unit 3 is arranged in this way in the intermediate image of the radiation-emitting regions, wherein the radiation emitted by the second radiation-emitting region 1*b* is reflected at the separating optical unit 3 to the secondary optical unit 4. The secondary optical unit 4 has two regions 4*a*, 4*b* spatially separated from one another, wherein a region of the secondary optical unit 4 is respectively assigned to a radiation-emitting region 1*a*, 1*b*. The beams separated according to the radiation-emitting regions 1*a*, 1*b* are thus reflected at different adjacent regions 4*a*, 4*b* of the secondary optical unit 4 in the direction of the coupling-out side of the apparatus.

For the rest, the exemplary embodiment in FIG. 4A substantially corresponds to the exemplary embodiment in FIG. 1.

Figure 4B:
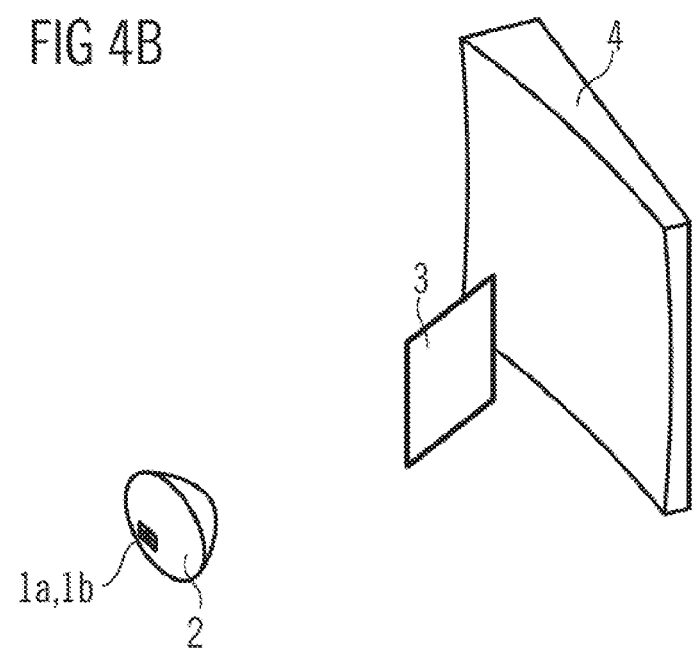

FIG. 4B illustrates the exemplary embodiment from FIG. 4A without beam paths, for the sake of clarity. The following optical components are disposed downstream of the radiation-emitting regions 1*a*, 1*b* in accordance with the following order: primary optical unit 2, separating optical unit 3, secondary optical unit 4. In this case, the separating optical unit 3 is a planar or plane mirror, and the secondary optical unit 4 is a curved reflector.

The distances between the individual components are designed in such a way as to obtain the best possible separation of the beams emitted by the radiation-emitting regions.

FIGS. 5A to 5D illustrate a further exemplary embodiment of a radiation-emitting apparatus 10 according to the invention.

In contrast to the exemplary embodiment illustrated in FIG. 4A, the primary optical unit 2 of the exemplary embodiment in FIG. 5A is embodied as a collector. The primary optical unit 2 has in particular two reflective surfaces 2*a*, 2*b*, at which the radiation emitted by the radiation-emitting regions 1*a*, 1*b* are reflected in the direction of downstream optical units. In this case, the radiation-emitting regions are arranged in the collector in such a way that the radiation emitted by the radiation-emitting regions is reflected at the first reflective surface 2*a* in the direction of further optical units.

The beam paths and reflections will be explained in greater detail in conjunction with FIGS. 5C and 5D.

In contrast to the exemplary embodiment in FIG. 4A, the secondary optical unit 4 has stepped adjacent regions 4*a*, 4*b*. In this case, the regions 4*a*, 4*b* of the secondary optical unit 4 are separated from one another by means of a step, the secondary optical unit 4 being embodied in an integral fashion. The step can further reduce a crosstalk of the beams reflected at the first region 4*a* of the secondary optical unit and at the second region 4*b* of the secondary optical unit.

For the rest, the exemplary embodiment in FIG. 5A substantially corresponds to the exemplary embodiment in FIG. 4A.

FIG. 5B shows the apparatus in accordance with the exemplary embodiment from FIG. 5A without beam paths, in order to enable better illustration. The individual optical components such as primary optical unit 2, separating optical unit 3 and secondary optical unit 4 are once again arranged with respect to one another in accordance with as precise separation as possible of the radiation emitted by the individual radiation-emitting regions.

In this case, the optical components and thus the apparatus have a size of approximately 135 mm by 80 mm by 85 mm.

The depth $D_1$ of the apparatus is approximately 135 mm, the length $D_3$ of the apparatus 85 mm, and the height $D_2$ of the apparatus 80 mm.

The beam paths of the individual radiation-emitting regions 1a, 1b are illustrated in greater detail in the exemplary embodiments in FIGS. 5C and 5D. FIG. 5C elucidates the beam path of the radiation of the first emitting region 1a. The radiation emitted by the first radiation-emitting region 1a is deflected at the first reflective surface $R_1$ of the primary optical unit 2 in the direction of the secondary optical unit 4. At the first region 4a of the secondary optical unit 4, the radiation of the first emitting region 1a is deflected in the direction of the coupling-out side of the apparatus ($R_2$). Consequently, the radiation of the first radiation-emitting region 1a experiences two reflections by the optical components. In this case, the radiation from the first radiation-emitting region 1a is guided past the separating optical unit 3 and, accordingly, is not reflected at the separating optical unit 3.

FIG. 5D illustrates the beam path of the second radiation-emitting region 1b. The radiation coupling-out from the second radiation-emitting region 1b is deflected at the first reflective surface $R_1$ of the primary optical unit 2 in the direction of the separating optical unit 3 ($R_2$). At the separating optical unit 3, said radiation is deflected in the direction toward the second reflective surface $R_3$ of the primary optical unit 2 and is directed there in the direction of the secondary optical unit 4. At the second region 4b of the secondary optical unit 4, this radiation is directed in the direction of the coupling-out side of the apparatus 10 ($R_4$). In the apparatus, the radiation emerging from the second radiation-emitting region 1b accordingly experiences four reflections before being coupled out from the apparatus. In this case, beam guiding by the optical components 2, 3 and 4 takes place such that the beam paths of the different radiation-emitting regions are separated to the greatest possible extent.

FIGS. 6A to 6C illustrate a further exemplary embodiment of a radiation-emitting apparatus 10 according to the invention. In contrast to the exemplary embodiment shown in FIG. 4A, no primary optical unit is employed in this case. Moreover, the separating optical unit 3 is embodied as a CPC-like concentrator. In particular, exactly one concentrator is disposed downstream of each radiation-emitting region. The radiation emerging from the concentrator is once again deflected at the secondary optical unit 4 in the direction of the radiation coupling-out side of the apparatus.

FIG. 6B shows the apparatus in accordance with FIG. 6A without beam paths, in order to enable better illustration. In this case, the apparatus has a dimensioning of approximately 67 mm by 95 mm by 85 mm. The distance $D_1$ between secondary optical unit 4 and radiation-emitting regions is approximately 87 mm, the height $D_2$ of the secondary optical unit is approximately 95 mm and the length of the secondary optical unit $D_3$ is approximately 85 mm.

For the rest, the exemplary embodiment in FIG. 6 substantially corresponds to the exemplary embodiment in FIG. 4.

The separating optical unit 3 from the exemplary embodiment in FIGS. 6A and 6B is illustrated in greater detail in FIG. 6C. The separating optical unit 3 has two concentrators 3a, 3b, a radiation-emitting region being respectively disposed upstream of a concentrator. In this case, the concentrators are arranged with respect to one another in such a way that their entrance surfaces directly adjoin one another, the exit surfaces being arranged at a distance from one another. The concentrators thus meet in the region of the entrance surface and from there diverge from one another in a forked manner. In this case, the exit surfaces have an anomorphic structure, for example.

The invention is not restricted to the exemplary embodiments by the description on the basis of said exemplary embodiments, but rather encompasses any novel feature and also any combination of features, which in particular includes any combination of features in the claims, even if these features or these combinations themselves are not explicitly specified in the claims or exemplary embodiments.

This patent application claims the priority of German patent application 10 2011 100 609.9, the disclosure content of which is hereby incorporated by reference.

The invention claimed is:

1. A radiation-emitting apparatus comprising:
   a separating optical unit, which is disposed downstream of a first radiation-emitting region, and a second radiation-emitting region in the emission direction and which is suitable for separating radiation emitted by the first radiation-emitting region and radiation emitted by the second radiation-emitting region from one another; and
   a secondary optical unit, which is disposed downstream of the separating optical unit,
   wherein the radiation emitted by the first radiation-emitting region is assigned to a first region of the secondary optical unit,
   wherein the radiation emitted by the second radiation-emitting region is assigned to a second region of the secondary optical unit, said second region being separated from the first region, and
   wherein the radiation-emitting regions are electrically drivable separately from one another.

2. The radiation-emitting apparatus according to claim 1, further comprising:
   a primary optical unit, which is arranged between the separating optical unit and the radiation-emitting regions.

3. The radiation-emitting apparatus according to claim 1, wherein the separating optical unit or the secondary optical unit is embodied as reflectors.

4. The radiation-emitting apparatus according to claim 2, wherein the primary optical unit is a converging optical unit, a collector or a light-refracting optical unit.

5. The radiation-emitting apparatus according to claim 4, wherein the primary optical unit is a reflector, a concentrator or a lens.

6. The radiation-emitting apparatus according to claim 2, wherein the distance between the radiation-emitting regions and the primary optical unit is in a range of between 1 mm and 20 mm.

7. The radiation-emitting apparatus according to claim 1, wherein the distance between the first radiation-emitting region and the second radiation-emitting region is in a range of between 30 μm and 3 mm.

8. The radiation-emitting apparatus according to claim 2, wherein the primary optical unit is an optical unit which is suitable for generating an intermediate image of the radiation-emitting regions in an intermediate plane between the primary optical unit and the secondary optical unit.

9. The radiation-emitting apparatus according to claim 8, wherein the separating optical unit is arranged in the intermediate image of the second radiation-emitting region.

10. The radiation-emitting apparatus according to claim 2, wherein the radiation emitted by the first radiation-emitting region experiences two reflections and the radiation emitted by the second radiation-emitting region experiences four reflections by the primary optical unit, the separating optical unit or the secondary optical unit.

11. The radiation-emitting apparatus according to claim 10, wherein the radiation emitted by the second radiation-emitting region experiences a reflection at the separating optical unit and the radiation emitted by the first radiation-emitting region is guided past the separating optical unit.

12. The radiation-emitting apparatus according to claim 1, wherein the radiation emitted by the first radiation-emitting region and the radiation emitted by the second radiation-emitting region fulfill different light functions.

13. The radiation-emitting apparatus according to claim 1, which fulfills both the Economic Commission for Europe (ECE) and the Society of Automotive Engineers (SAE) standards.

14. The use of a radiation-emitting apparatus according to claim 1 as automobile headlight, bicycle light, interior or exterior lighting system, lighting in domestic appliances or optical encoders.

15. A radiation-emitting apparatus comprising:
a separating optical unit, which is disposed downstream of a first radiation-emitting region, and a second radiation-emitting region in the emission direction and which is suitable for separating radiation emitted by the first radiation-emitting region and radiation emitted by the second radiation-emitting region from one another; and
a secondary optical unit, which is disposed downstream of the separating optical unit, wherein
the radiation emitted by the first radiation-emitting region is assigned to a first region of the secondary optical unit,
the radiation emitted by the second radiation-emitting region is assigned to a second region of the secondary optical unit, said second region being separated from the first region, and
a primary optical unit, which is arranged between the separating optical unit and the radiation-emitting regions,
wherein
the radiation emitted by the radiation-emitting regions firstly impinges on the primary optical unit,
the primary optical unit is an optical unit which is suitable for generating an intermediate image of the radiation-emitting regions in an intermediate plane between the primary optical unit and the secondary optical unit,
the separating optical unit and the secondary optical unit are embodied as reflectors,
the separating optical unit is arranged in the intermediate image of the second radiation-emitting region,
the first radiation-emitting region and the second radiation-emitting region are arranged on a common circuit board, and
the radiation-emitting regions each have a semiconductor body which comprises an active layer suitable for generation.

16. The radiation-emitting apparatus according to claim 15, wherein
the radiation emitted by the second radiation-emitting region is reflected at the separating optical unit to the secondary optical unit,
the secondary optical unit has two regions spatially separated from one another, wherein each of said regions is respectively assigned to one of the radiation-emitting regions,
the beams are separated by the secondary optical unit according to the radiation-emitting regions and are reflected at said different adjacent regions of the secondary optical unit in the direction of a coupling-out side of the apparatus, and
the primary optical unit is a converging lens, the separating optical unit is a plane mirror and the secondary optical unit is a curved reflector.

17. A radiation-emitting apparatus comprising:
a separating optical unit, which is disposed downstream of a first radiation-emitting region, and a second radiation-emitting region in the emission direction and which is suitable for separating radiation emitted by the first radiation-emitting region and radiation emitted by the second radiation-emitting region from one another;
a secondary optical unit, which is disposed downstream of the separating optical unit,
wherein the radiation emitted by the first radiation-emitting region is assigned to a first region of the secondary optical unit,
wherein the radiation emitted by the second radiation-emitting region is assigned to a second region of the secondary optical unit, said second region being separated from the first region; and
a primary optical unit, which is arranged between the separating optical unit and the radiation-emitting regions,
wherein the primary optical unit is a converging optical unit, a collector or a light-refracting optical unit.

* * * * *